UNITED STATES PATENT OFFICE.

JEAN BAPTISTE FERDINAND FRÉDUREAU, OF PARIS, FRANCE.

COMPOSITION OF MATTER FOR MANUFACTURE OF CROCKERY-WARE, PIPES, OR OTHER ARTICLES.

SPECIFICATION forming part of Letters Patent No. 510,065, dated December 5, 1893.

Application filed June 17, 1891. Serial No. 396,621. (No specimens.) Patented in France March 9, 1886, No. 174,637; in England May 31, 1886, No. 7,285, and in Belgium September 8, 1886, No. 74,491.

*To all whom it may concern:*

Be it known that I, JEAN BAPTISTE FERDINAND FRÉDUREAU, a citizen of the Republic of France, residing at Paris, France, have invented a certain new and useful Composition of Matter for the Manufacture of Crockery-Ware, Pipes, and other Articles, (for which I have obtained patents in France, No. 174,637, dated March 9, 1886, and patent of addition thereto; in England, No. 7,285, dated May 31, 1886, and in Belgium, No. 74,491, dated September 8, 1886,) of which the following is a specification.

This invention has for its object to provide a new composition of matter having a basis of silicate of alumina and one or more soluble salts of potassium, sodium, ammonium, barium, calcium, and adapted for many industrial purposes for instance for electrical insulating, for the manufacture of crockery ware, pipe, &c., or other articles formed by cutting, molding or carving the substances. By pulverizing rock mainly formed of silicate of alumina, for example, slate, feldspar or clay and thoroughly mixing the powder in predetermined proportions with one or more soluble salts of potassium sodium, ammonium, barium or calcium such as their chlorides, carbonates, nitrates and silicates (so as to obtain either a paste or powder) there result certain chemical combinations between the various elements, even while the mixture is cold (provided that the soluble salts employed are silicate) but more rapidly under the action of heat. I would premise that the relative proportions of silicate of alumina and the above mentioned soluble salts of which the compound is formed are variable within very wide limits inasmuch as each of these elements imparts to the eventual product certain peculiar properties specially adapting it for certain peculiar purposes according to which therefore the proportions change. For instance the material will be the harder the greater is the proportion of silicate employed. It should also be observed that the compound may contain some of the impurities (such as metallic oxides, notably oxide of iron) which existed in the pulverized rock. I only mention this to call attention to the fact that the presence of these impurities does not alter the fundamental properties of the product to be obtained.

To make the process of manufacture quite clear I will give an instance where I have taken powdered natural slate whose composition is—

| | Parts. |
|---|---|
| $SiO_2$ | 57 |
| $Al_2O_3$ | 36 |
| Oxide of iron | 3 |
| Water | 4 |
| | 100 | and by adding twenty parts silicate of soda ($NaO_3SiO_2$) the result is—

| | Parts. |
|---|---|
| $SiO_2$ | 72 to 73 |
| $Al_2O_3$ | 36 |
| Oxide of iron | 3 |
| Water | 4 |
| $NaO$ | 4 to 5 |
| | 120 |

This admixture when the water has dried out and the oxide of iron which is simply an impurity is not taken into account gives—

| | Parts. |
|---|---|
| Silica ($SiO_2$) | 65 |
| Alumina ($Al_2O_3$) | 31 |
| Soda ($NaO$) | 4 |
| | 100 |

This mixture may assume the appearance of either a slightly moistened powder or a paste. In the former case the powder is molded and compressed; in the latter the paste is treated in the same way as plastic clay but with greater care. A few hours after formed even in a cold condition, the mixture will be found to have considerably hardened, when it can be operated upon like wood by means of saws in lathes and the like, and the hardening will continue until the material is thoroughly dry. If the composition thus hardened be submitted to the action of heat chemical reactions very quickly set in, or in other words there takes place a metamorphism of the ingredients and a very hard body is obtained of which the following are the most noteworthy properties adapting it for many industrial purposes as it can have been previously given any desired shape: First, it resists remarkably well the action of water, acids of any degree of concentration, and chemical agents generally speaking adapting it for vessels, &c.; second, it is a first rate electrical insulator adapting it for electrical insulators, conduits, &c.; third, the shrinking of the material during the baking operation is practically *nil;* fourth, its hardness is very considerable, but varies according to the temperature and degree of metamorphism attained in the baking operation; it being however capable of being immersed in water or any other suitable liquid without detriment.

It will be seen that the properties above-named enable the composition to be used to advantage for the manufacture of vessels, pipes, cocks, machines and parts of machinery liable to come into contact with chemicals and notably acids; and on the other hand to be used in connection with electrical conductors and electrical apparatus of any description.

There is one last point to which I will refer in conclusion. By taking the composition which has not yet undergone the baking operation and submitting it to high pressure in a digester under a high temperature together with fatty substances, or resin, colophony and the like, these materials are embodied in the composition penetrating it all over and render the composition completely proof against water and the most concentrated acids, even pure hydro-fluoric acid.

I claim—

1. The above described composition consisting of silicate of alumina combined with a soluble alkaline salt, such as soluble salts of sodium, potassium, calcium barium or ammonium; substantially as described.

2. The above described composition consisting of silicate of alumina combined with a soluble alkaline salt, such as soluble salt of sodium, potassium, calcium, barium or ammonium, and impregnated with fatty or resinous substances, whereby it is rendered completely water proof and impervious to corrosive chemical products, substantially as described.

In testimony whereof I have hereunto set my hand in the presence of the two subscribing witnesses.

JEAN BAPTISTE FERDINAND FRÉDUREAU.

Witnesses:
ROBT. M. HOOPER,
FERDINAND DOBLER.